(12) United States Patent
Kitaoka et al.

(10) Patent No.: US 7,441,976 B2
(45) Date of Patent: Oct. 28, 2008

(54) WATER-BASED INK COMPOSITION FOR BALLPOINT PEN AND BALLPOINT PEN COMPRISING THE SAME

(75) Inventors: Nobuyuki Kitaoka, Nagoya (JP); Yoshiaki Ono, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 532 days.

(21) Appl. No.: 11/226,216

(22) Filed: Sep. 15, 2005

(65) Prior Publication Data

US 2006/0088363 A1    Apr. 27, 2006

(30) Foreign Application Priority Data

Sep. 17, 2004  (JP)  ............... P.2004-270917
Jul. 8, 2005   (JP)  ............... P.2005-199669
Jul. 8, 2005   (JP)  ............... P.2005-199670

(51) Int. Cl.
   *C09D 11/00*  (2006.01)
   *B43K 7/00*   (2006.01)
(52) U.S. Cl. ............ 401/209; 401/141; 106/31.13; 106/31.68
(58) Field of Classification Search ......... 401/109–112, 401/141, 142, 208, 209; 106/31.13, 31.25, 106/31.68, 31.85, 31.86
See application file for complete search history.

(56) References Cited

U.S. PATENT DOCUMENTS

| 5,466,281 A | 11/1995 | Hanke et al. |
| 6,340,261 B1 * | 1/2002 | Furukawa ............ 401/216 |
| 6,616,741 B1 | 9/2003 | Sawa et al. |
| 2002/0033117 A1 | 3/2002 | Inoue et al. |

FOREIGN PATENT DOCUMENTS

| JP | 59-74175 A | 4/1984 |
| WO | WO 2004/011558 A1 | 2/2004 |

OTHER PUBLICATIONS

European Search Report dated Jul. 25, 2007.

* cited by examiner

*Primary Examiner*—David J Walczak
(74) *Attorney, Agent, or Firm*—Sughrue Mion, PLLC

(57) ABSTRACT

A water-based ink composition for ballpoint pen, which comprises at least a colorant, water, a shear-thinning tackifier and a thickening inhibitor, wherein a ratio (x) of a viscosity after evaporation of 40 wt % of water from the total ink amount to an initial ink viscosity (as measured by EMD viscometer at 1 rpm and 20° C.) is 2 or less; and a ballpoint pen comprising the same.

20 Claims, No Drawings

WATER-BASED INK COMPOSITION FOR BALLPOINT PEN AND BALLPOINT PEN COMPRISING THE SAME

This is a Utility Application under 35 U.S.C. § 1.111(a) which claims priority from Japanese Patent Application 2004-270917 filed Sep.17, 2004, Japanese Patent Application 2005-199669 filed on Jul. 8, 2005, and Japanese Patent Application 2005-199670 filed on Jul. 8, 2005.

FIELD OF THE INVENTION

The present invention relates to a water-based ink composition for ballpoint pen and a ballpoint pen comprising the same. More specifically, the invention pertains to a water-based ink composition for ballpoint pen excellent in dry-up resistance at a pen tip, and a water-based ballpoint pen comprising the same.

BACKGROUND ART

As an ink composition filled in a ballpoint pen, water-based ink compositions using water as a main solvent have ordinarily been used in recent years in consideration of an environmental problem and safety to the human body. Of such compositions, those having a shear-thinning viscosity cannot cause bleed of handwriting which will otherwise occur when a low-viscosity water-based ballpoint pen is used.

As a substance (shear-thinning tackifier) giving to the ink composition shear-thinning viscosity, polysaccharides such as xanthan gum can be mentioned as an example (refer to, for example, Patent Reference 1).

The shear-thinning tackifier however sometimes hinders dry-up resistance. Even if an additive, for example, a humectant such as Water soluble organic solvent or solid humectant such as urea is used in combination to improve dry-up resistance, dry-up cannot be prevented fully and in addition, failure in writing such as blur tends to occur owing to an increase in ink viscosity.

Described specifically, excessive addition of urea causes-evaporation of water from the writing tip end to raise the concentration of a water soluble organic solvent. This causes so-called flowering phenomenon, that is, precipitation of the solid content at the writing tip end, which is not favorable visually. At the same time, it causes blur. Moreover, addition of a large amount of a water soluble organic solvent or urea tends to have harmful effects such as occurrence of sag when the ballpoint pen is left with the writing tip end down under high humidity environments.

As described above, the dry-up resistance of an ink composition can be improved by various methods, but none of them can fully solve the problems such as blur of handwriting and sag. Dry-up resistance is an important factor. In particular, when an ink composition is used for a ballpoint pen (capless ballpoint pen) which does not need a cap and has a writing tip end always opened in the air during non-writing time, dry-up resistance is an important factor.

[Patent Reference 1] JP-A-sho 59-74175

SUMMARY OF THE INVENTION

An object of the invention is to overcome the above-described problem of the ink composition used for ballpoint pen, that is, to provide a water-based ink composition for ballpoint pen capable of satisfying dry-up resistance without damaging various other writing performances and a ballpoint pen filled with the composition.

The present invention has a following constitution.

(1) A water-based ink composition for ballpoint pen, which comprises at least a colorant, water, a shear-thinning tackifier and a thickening inhibitor, wherein a ratio (x) of a viscosity after evaporation of 40 wt % of water from the total ink amount to an initial ink viscosity (as measured by EMD viscometer at 1 rpm and 20° C.) is 2 or less.

(2) A water-based ink composition for ballpoint pen, which comprises at least a colorant, water, a shear-thinning tackifier, and a thickening inhibitor selected from the group consisting of compounds represented by the following formulas (1) to (6), an oligomer of N-vinyl-2-piperidone and an oligomer of N-vinyl-ε-caprolactam:

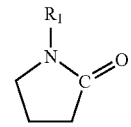
(1)

(wherein, $R_1$ represents a linear or branched $C_{2-8}$ alkyl group or a cyclohexyl group),

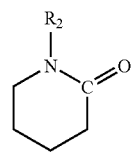
(2)

(wherein, $R_2$ represents a linear or branched $C_{1-7}$ alkyl group, a vinyl group or a cyclohexyl group),

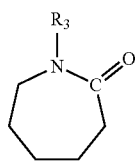
(3)

(wherein, $R_3$ represents a linear or branched $C_{1-6}$ alkyl group, a vinyl group or a cyclohexyl group),.

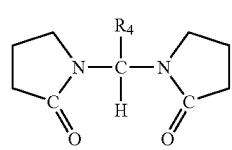
(4)

(wherein, $R_4$ represents a linear or branched $C_{1-10}$ alkyl group),

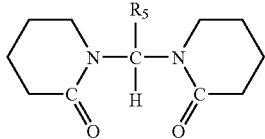

(5)

(wherein, $R_5$ represents a hydrogen atom, or a linear or branched $C_{1-8}$ alkyl group), and

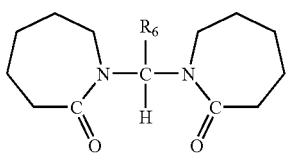

(6)

(wherein, $R_6$ represents a hydrogen atom or a linear or branched $C_{1-6}$ alkyl group.)

(3) A water-based ink composition for capless ballpoint pen, which is filled in a capless ballpoint pen wherein a writing tip end of a ballpoint pen refill protrudes or retracts from a front-end opening portion of a barrel, actuated by a retractable mechanism, wherein the ink composition comprises at least a colorant, water, a shear-thinning tackifier and a thickening inhibitor, and wherein a ratio (x) of a viscosity after evaporation of 40 wt % of water from the total ink amount to an initial ink viscosity (as measured by EMD viscometer at 1 rpm and 20° C.) is 2 or less.

(4) A water-based ink composition for capless ballpoint pen, which is filled in a capless ballpoint pen wherein a writing tip end of a ballpoint pen refill protrudes or retracts from a front-end opening portion of a barrel, actuated by a retractable mechanism, wherein the ink composition comprises at least a colorant, water, a shear-thinning tackifier and a thickening inhibitor selected from an oligomer of N-vinyl-2-pyrrolidone, N-vinyl-2-pyrrolidone, N-cyclohexyl-2-pyrrolidone and ε-caprolactam.

(5) The water-based ink composition for ballpoint pen according to any one of the above (1) to (4), which comprises the thickening inhibitor in an amount of from 1 to 40 wt %.

(6) The water-based ink composition for ballpoint pen according to any one of the above (1) to (5), wherein the shear-thinning tackifier is a polysaccharide.

(7) The water-based ink composition for ballpoint pen according to the above (6), wherein the shear-thinning tackifier is selected from xanthan gum, welan gum and succinoglycan.

(8) The water-based ink composition for ballpoint pen according to any one of the above (1) to (7), which further comprises a sugar mixture containing at least 40 wt % of saccharides having at least 10 monosaccharide molecules.

(9) The water-based ink composition for ballpoint pen according to the above (8), wherein the sugar mixture is a glucose syrup or hydrogenated glucose syrup.

(10) The water-based ink composition for ballpoint pen according to the above (8) or (9), wherein the sugar mixture is contained in an amount of from 0.5 to 10 wt %.

(11) The water-based ink composition for ballpoint pen according to any one of the above (1) to (10), which is free of a water soluble organic solvent.

(12) The water-based ink composition for ballpoint pent according to any one of the above (1) to (10), which further comprises a water soluble organic solvent, wherein a content of the water soluble organic solvent is 10 wt % or less based on the total amount of the ink composition.

(13) A ballpoint pen having, stored in a barrel thereof, a ballpoint pen refill filled with a water-based ink composition according to the above (1) or (2).

(14) A ballpoint pen having, filled in a barrel thereof, a water-based ink composition for ballpoint pen according to the above (1) or (2).

(15) A ballpoint pen according to the above (13) or (14), wherein the water-based ink composition for ballpoint pen has, at a rear end surface thereof, an ink follower which follows an ink in accordance with ink consumption.

(16) The ballpoint pen according to any one of the above (13) to (15), equipped with a cap.

(17) A capless ballpoint pen which comprises a ballpoint pen refill and a water-based ink composition for ballpoint pen according to the above (2) to (4) filled therein, wherein a writing tip end of said ballpoint pen refill protrudes or retracts from a front-end opening portion of a barrel, actuated by a retractable mechanism.

(18) The capless ballpoint pen according to the above (17), which comprises an ink follower which follows an ink in accordance with ink consumption, disposed at a rear end surface of the water-based ink composition for ballpoint pen.

The water-based ink composition for ballpoint pen and a ballpoint pen comprising the same according to the invention are, owing to the above-described thickening inhibitor incorporated in the composition, excellent in dry-up resistance without causing an excessive rise in ink viscosity even after evaporation of water from ink, provides comfortable writing just after writing is started or after an elapsed time, exhibits stable writing performance continuously without causing any inconvenience such as blur or sag and provides good handwriting continuously.

DETAILED DESCRIPTION OF THE INVENTION

Examples of the thickening inhibitor include compounds represented by the formulas (1) to (6), an oligomer of N-vinyl-2-piperidone and an oligomer of N-vinyl-ε-caprolactam.

Specific examples of the compound represented by the formula (1) include N-alkyl-2-pyrrolidones having as $R_1$ a linear or branched $C_{2-8}$ alkyl group, preferably a linear or branched $C_{3-7}$ alkyl group, more preferably a linear or branched $C_{4-6}$ alkyl group; and N-cyclohexyl-2-pyrrolidone having as $R_1$ a cyclohexyl group.

Specific examples of the linear or branched alkyl group as $R_1$ include ethyl, n-propyl, iso-propyl, n-butyl, iso-butyl, sec-butyl, tert-butyl, n-pentyl, 1-methylbutyl, 2-methylbutyl, 3-methylbutyl, 1,1-dimethylpropyl, 2,2-dimethylpropyl, 1-ethylpropyl, n-hexyl, 1-methylpentyl, 2-methylpentyl, 3-methylpentyl, 1-ethylbutyl, 2-ethylbutyl, n-heptyl, 1-methylheptyl, 1-ethylpentyl, n-octyl, 1-methylheptyl, 2-ethylhexyl and 2,5-dimethylhexyl. The linear or branched alkyl group is not limited to the above-described ones insofar as the number of carbon atoms falls within the above-described range.

When the alkyl group as $R_1$ has one carbon atom, thickening inhibition effects brought by the resulting thickening inhibitor are not sufficient. When the number of carbon atoms of $R_1$ exceeds 8, on the other hand, the resulting thickening inhibitor has increased oil solubility, which disturbs uniform dissolution of it in ink and deteriorates stability.

Specific examples of the compound represented by the formula (2) include N-alkyl-2-piperidones having as $R_2$ a linear or branched $C_{1-7}$ alkyl group, preferably a linear or branched $C_{2-6}$ alkyl group, more preferably a linear or branched $C_{3-5}$ alkyl group; N-vinyl-2-piperidone having as $R_2$ a vinyl group; and N-cyclohexyl-2-piperidone having as $R_2$ a cyclohexyl group.

Specific examples of the linear or branched alkyl group as $R_2$ include methyl, ethyl, n-propyl, iso-propyl, n-butyl, iso-butyl, sec-butyl, tert-butyl, n-pentyl, 1-methylbutyl, 2-methylbutyl, 3-methylbutyl, 1,1-dimethylpropyl, 2,2-dimethylpropyl, 1-ethylpropyl, n-hexyl, 1-methylpentyl, 2-methylpentyl, 3-methylpentyl, 1-ethylbutyl, 2-ethylbutyl, n-heptyl, 1-methylhexyl and 1-ethylpentyl. The linear or branched alkyl group is not limited to the above-described ones insofar as the number of carbon atoms falls within the above-described range.

When $R_2$ represents a hydrogen atom, thickening inhibition effects brought about by the resulting thickening inhibitor are not satisfactory. When the number of carbon atoms of $R_2$ exceeds 7, on the other hand, the resulting thickening inhibitor has increased oil solubility, which disturbs uniform dissolution of it in ink and deteriorates stability.

Specific examples of the compound represented by the formula (3) include N-alkyl-ε-caprolactams having as $R_3$ a linear or branched $C_{1-6}$ alkyl group, preferably a linear or branched $C_{2-5}$ alkyl group, more preferably a linear or branched $C_{3-4}$ alkyl group; N-vinyl-ε-caprolactam having as $R_3$ a vinyl group; and N-cyclohexyl-ε-caprolactam having as $R_3$ a cyclohexyl group.

Specific examples of the linear or branched alkyl group as $R_3$ include methyl, ethyl, n-propyl, iso-propyl, n-butyl, iso-butyl, sec-butyl, tert-butyl, n-pentyl, 1-methylbutyl, 2-methylbutyl, 3-methylbutyl, 1,1-dimethylpropyl, 2,2-dimethylpropyl, 1-ethylpropyl, n-hexyl, 1-methylpentyl, 2-methylpentyl, 3-methylpentyl, 1-ethylbutyl and 2-ethylbutyl. The linear or branched alkyl group is not limited to the above-described ones insofar as the number of carbon atoms falls within the above-described range.

When the number of carbon atoms of $R_3$ exceeds 6, the resulting thickening inhibitor has increased oil solubility, which disturbs uniform dissolution of it in ink and deteriorates stability.

Specific examples of the compound represented by the formula (4) include 2:1 condensates of 2-pyrrolidone and aldehyde having as $R_4$ a linear or branched $C_{1-10}$ alkyl group.

Specific examples of the linear or branched $C_{1-10}$ alkyl group include methyl, ethyl, n-propyl, iso-propyl, n-butyl, iso-butyl, sec-butyl, tert-butyl, n-pentyl, 1-methylbutyl, 2-ethylpropyl, n-hexyl, n-heptyl, 2-ethylpentyl, n-octyl, 2,4,4-trimethylpentyl, n-nonyl and n-decyl. The linear or branched alkyl group is not limited to the above-described ones insofar as the number of carbon atoms falls within the above-described range.

When $R_4$ represents a hydrogen atom, thickening inhibition effects brought about by the resulting thickening inhibitor are not satisfactory. When the number of carbon atoms of $R_4$ exceeds 10, on the other hand, the resulting thickening inhibitor has increased oil solubility, which disturbs uniform dissolution of it in ink and deteriorates stability.

Specific examples of the compound represented by the formula (5) include 2:1 condensates of 2-piperidone and aldehyde having as $R_5$ a hydrogen atom or a linear or branched $C_{1-8}$ alkyl group.

Specific examples of the linear or branched $C_{1-8}$ alkyl group as $R_5$ include methyl, ethyl, n-propyl, iso-propyl, n-butyl, iso-butyl, sec-butyl, tert-butyl, n-pentyl, 1-methylbutyl, 2-ethylpropyl, n-hexyl, n-heptyl, 2-ethylpentyl, n-octyl and 2,4,4-trimethylpentyl. The linear or branched alkyl group is not limited to the above-described ones insofar as the number of carbon atoms falls within the above-described range.

When the number of carbon atoms of $R_5$ exceeds 8, the resulting thickening inhibitor has increased oil solubility, which disturbs uniform dissolution of it in ink and deteriorates stability.

Specific examples of the compound represented by the formula (6) include 2:1 condensates of ε-caprolactam and aldehyde having as $R_6$ a hydrogen atom or a linear or branched $C_{1-6}$ alkyl group.

Specific examples of the linear or branched $C_{1-6}$ alkyl group as $R_6$ include methyl, ethyl, n-propyl, iso-propyl, n-butyl, iso-butyl, sec-butyl, tert-butyl, n-pentyl, 1-methylbutyl, 2-ethylpropyl and n-hexyl. The linear or branched alkyl group is not limited to the above-described ones insofar as the number of carbon atoms falls within the above-described range.

When the number of carbon atoms of $R_6$ exceeds 6, the resulting thickening inhibitor has increased oil solubility, which disturbs uniform dissolution of it in a water-based ink composition.

An Oligomer of N-vinyl-2-piperidone or an oligomer of N-vinyl-ε-caprolactam have a polymerization degree (n) of from 2 to 18, preferably from 2 to 10, more preferably from 2 to 6. Two or more oligomers different in polymerization degree may be added to the ink.

When the polymerization degree of the oligomers is large (for example, exceeds 20), they tend to exist in the solid form in an ink and therefore, desired dry-up resistance can hardly be satisfied.

The water-based ink composition for ballpoint pen containing a thickening inhibitor selected from the above-described compounds represented by formulas (1) to (6), an oligomer of N-vinyl-2-piperidone and an oligomer of N-vinyl-ε-caprolactam is filled in a ballpoint pen equipped with a cap covering a writing tip end therewith, or in a ballpoint pen (capless ballpoint pen) equipped with no cap and having a writing tip end protruded or retracted from the front end opening portion of a barrel, actuated by a retractable mechanism, and then provided for use.

As the above-described thickening inhibitor, an oligomer of N-vinyl-2-pyrrolidone, N-vinyl-2-pyrrolidone, N-cyclohexyl-2-pyrrolidone and ε-caprolactam can also be used instead.

Oligomers of N-vinyl-2-pyrrolidone preferred as the thickening inhibitor are compounds represented by the formula (7):

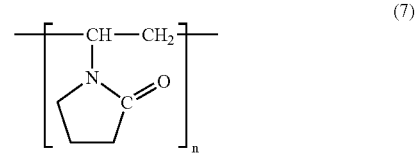

(7)

(wherein, n stands for an integer of from 2 to 20) and those having a polymerization degree (n) of from 2 to 20, preferably from 2 to 10, more preferably from 2 to 6 are used. Two or more oligomers of N-vinyl-2-pyrrolidome different in the polymerization degree may be added to the ink.

When an oligomer of N-vinyl-2-pyrrolidone has a large polymerization degree (for example, exceeding 20), it tends to exist in the solid form in ink so that desired dry-up resistance can hardly be satisfied.

The water-based ink composition for ballpoint pen comprising a thickening inhibitor selected from an oligomer of N-vinyl-2-pyrrolidone, N-vinyl-2-pyrrolidone, N-cyclohexyl-2-pyrrolidone and ϵ-caprolactam is provided for practical use after filled in a ballpoint pen (capless ballpoint pen) equipped with no cap and having its writing tip end protruded or retracted from the front end opening portion of a barrel, actuated by a retractable mechanism.

Different from urea, the above-described thickening inhibitor can prevent blur or failure in writing while neither causing sag or drip-drop, absorbing water from the air under high humidity conditions nor a marked increase in the ink viscosity.

In the present invention, in a system containing a shear thinning tackifier and a thickening inhibitor in ink, a ratio (x) of a viscosity after evaporation of 40 wt % of water from the total ink amount to an initial ink viscosity (as measured by EMD viscometer at 1 rpm and 20° C.) is 2 or less, preferably 0.01 or greater but not greater than 2.

When the above-described ratio exceeds 2, a difference between the viscosity after evaporation of 40 wt % of water from the total ink amount and the initial viscosity becomes too large, tending to cause blur or failure in writing owing to a viscosity increase.

The thickening inhibitor used in the present invention is added in an amount of from 1 to 40 wt %, preferably from 3 to 30 wt %, more preferably from 3 to 15 wt %, based on the total ink amount. When the amount thereof is less than 1 wt %, an addition of it is not effective for improving dry-up resistance. When the amount exceeds 40 wt %, on the other hand, the shear-thinning tackifier does not swell enough in the ink and desired ink viscosity cannot be attained easily.

As the colorant, any dyes and pigments soluble or dispersible in an aqueous medium can be used. Specific examples of them will next be described.

As acid dyes, usable are:
New Coccine (C.I. 16255),
Tartrazine (C.I. 19140),
Acid Blue Black 10B (C.I. 20470),
Guinea Green (C.I. 42085),
Brilliant Blue FCF (C.I. 42090),
Acid Violet 6BN (C.I. 43525),
Soluble Blue (C.I. 42755),
Naphthalene Green (C.I. 44025),
Eosine (C.I. 45380),
Phloxine (C.I. 45410),
Erythrosin (C.I. 45430),
Nigrosine (C.I. 50420), and
Acid Flavin (C.I. 56205).
As basic dyes, usable are:
Chrysoidine (C.I. 11270),
Methyl Violet FN (C.I. 42535),
Crystal Violet (C.I. 42555),
Malachite Green (C.I. 42000),
Victoria Blue FB (C.I. 44045),
Rhodamine B (C.I. 45170),
Acridine Orange NS (C.I. 46005), and
Methylene Blue B (C.I. 52015).
As direct dyes, usable are:
Congo Red (C.I. 22120),
Direct Sky Blue 5B (C.I. 24400),
Violet BB (C.I. 27905),
Direct Deep Black EX (C.I. 30235),
Kayarus Black G Conc (C.I. 35225),
Direct Fast Black G (C.I. 35255), and
Phthalocyanine Blue (C.I. 74180).

As the pigment, usable are inorganic pigments such as carbon black and ultramarine, organic pigments such as copper phthalocyanine blue and benzidine yellow, and aqueous pigment dispersions prepared in advance by finely and stably dispersing a pigment in an aqueous medium with an aid of a surfactant or water soluble resin.

Specific examples of the aqueous pigment dispersion obtained with an aid of a surfactant include:

C.I. Pigment Blue 15:3B (trade name: "Sandye Super Blue GLL", product of Sanyo Color Works, Ltd., having a pigment content of 22%), C.I. Pigment Red 146 (trade name: "Sandye Super Pink FBL", product of Sanyo Color Works, Ltd., having a pigment content of 24%), C.I. Pigment Yellow 81 (trade name: "TC Yellow FG", product of Dainichiseika Color & Chemicals Mfg. Co., Ltd, having a pigment content of about 30%), and C.I. Pigment Red 220/166 (trade name: "TC Red FG", product of Dainichiseika Color & Chemicals Mfg. Co., Ltd, having a pigment content of about 35%).

Examples of the aqueous pigment dispersion obtained with an aid of a water soluble resin include:

C.I. Pigment Black 7 (trade name: "WA Color Black A250", product of Dainichiseika Color & Chemicals Mfg. Co., Ltd, having a pigment content of 15%), C.I. Pigment Green 7 (trade name: "WA-S Color Green", product of Dainichiseika Color & Chemicals Mfg. Co., Ltd, having a pigment content of 8%), C.I. Pigment Violet 23 (trade name: "Micropigmo WMVT-5", product of Orient Chemical Industries, Ltd., having a pigment content of 20%), and C.I. Pigment Yellow 83 (trade name: "Emacol NS Yellow 4618", product of Sanyo Color Works, Ltd., having a pigment content of 30%).

As a fluorescent pigment, fluorescent pigments in the synthetic resin fine particulate form obtained by forming a solid solution of a fluorescent dye in a resin matrix can be used. Additional examples include pearlescent pigments, metal powder pigments, light storing pigments, white pigments such as titanium dioxide, silica and calcium carbonate, capsule pigments having a reversible thermochromic composition encapsulated therein, and capsule pigments having a perfume encapsulated therein.

Examples of the metalescent pigment include metalescent pigments such as aluminum and brass; metalescent pigments (pearlescent pigments) prepared by covering the surface of a core substance such as natural mica, synthetic mica, glass piece, alumina or transparent film piece with a metal oxide such as titanium dioxide; metalescent pigments obtained by forming a metal deposited film over a transparent or colored transparent film; and metalescent pigments having iridescence obtained by stacking a plurality of transparent resin layers one after another and then cutting the resulting iridescent film into fine pieces.

The above-described colorants can be used either singly or in combination as needed. Its content in the ink composition is from 1 to 25 wt.%, preferably from 2 to 15 wt.%.

When a pigment is used as the colorant, a pigment dispersant can be added as needed. Examples of the pigment dispersant include surfactants such as anionic surfactants and nonionic surfactants, anionic polymers such as polyacrylic acid and styrene-acrylic acid and nonionic polymers such as polyvinylpyrrolidone and polyvinyl alcohol.

Moreover, water soluble organic solvents having compatibility with water and conventionally used for general purpose can be used.

Examples of such a water soluble organic solvent include ethanol, propanol, butanol, glycerin, sorbitol, triethanolamine, diethanolamine, monoethanolamine, ethylene glycol, diethylene glycol, thiodiethylene glycol, hexylene glycol, 1,3-butanediol, neoprene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, sulfolane, 2-pyrrolidone, and N-methyl-2-pyrrolidone.

These water soluble organic solvents may be used either singly or in combination. Their content is preferably 10 wt % or less relative to the total amount of the ink composition.

The water-based ink composition for ballpoint pen according to the invention contains the above-described thickening inhibitor so that positive improvement in dry-up resistance by the addition of a water soluble organic solvent is not required. Accordingly, the composition is able to exhibit a sufficient performance when the addition amount is as small as 10 wt % or less. or even when the water soluble organic solvent is not added.

In addition, since the addition amount of the water soluble organic solvent is smaller compared with the conventional ink compositions, it is possible to prevent inconveniences, which will otherwise occur by the accumulation (sag) of ink at the writing tip end owing to the water absorption by the water soluble organic solvent, for example, damage to the formation of good handwriting and accidental staining of clothes.

As well as the above-described components, a pH regulator, for example, an inorganic salt such as sodium carbonate, sodium phosphate or sodium acetate or an organic basic compound such as water soluble amine compound; a rust inhibitive such as benzotriazole or derivative thereof, tolyltriazole, dicyclohexylammonium nitrite, diisopropylammonium nitrite, sodium thiosulfate or saponin, an antiseptic or mildew proofing agent such as carbolic acid, sodium salt of 1,2-benzothiazolin-3-one, sodium benzoate, sodium dehydroacetate, potassium sorbate, propyl paraoxybenzoate or 2,3,5,6-tetrachloro-4-(methylsulfonyl)pyridine, a lubricant such as metal soap, polyalkylene glycol, fatty acid ester, ethylene oxide-added cationic activator, phosphate-type activator, thiocarbamate, or dimethyldithiocarbamate, an antioxidant such ascorbic acid, ascorbic acid derivative, α-tocopherol, catechin, catechin derivative, synthesized polyphenol, phosphonate, phosphinate, sulfite, sulfoxylate, dithionite, thiosulfate, thiourea dioxide, formamidinesulfinic acid, or glutathione, humectant such as urea, nonionic surfactant, sorbitol, mannitol, sucrose, glucose, hydrogenated starch hydrolysate or sodium pyrophosphate, a fluorine-containing surfactant as well as a nonionic, anionic or cationic surfactant for promoting ink penetration, a defoaming agent such as dimethylpolysiloxane, or a dispersant may also be added to the ink composition as needed.

The shear-thinning viscosity of the ink composition is a rheological property such that when the ink composition is in a static condition or when a low stress is applied to it, the ink composition becomes highly viscous and does not flow easily, while when it is under an increased stress, it has a decreased viscosity and exhibits good fluidity. Therefore, the shear-thinning viscosity means a liquid property also referred to as a thixotropic or pseudoplastic property. Under a high shear stress during writing, the three dimensional structure of the ink composition is temporarily destroyed to cause a decrease in the viscosity of ink. The ink at the writing tip end then becomes a low-viscosity ink suited for writing and transferred onto the surface of paper. While not used for writing, the ink has an increased viscosity so that leakage of ink or separation or backflow of ink can be prevented. Moreover, the physical properties of the ink can be kept stable even after the passage of time.

Particularly in a ballpoint pen holding a ball at the writing tip end thereof, it is required that the ink in the vicinity of the ball has a low viscosity suited for writing under high shear stress during writing and has an ink property permitting movement between a ball and a ball house by a capillary force and transfer onto a paper surface; and when it is not used for writing, all the ink including that in the vicinity of the ball has an increased viscosity to prevent leakage of the ink or separation or backflow of the ink. The ink composition having an ink viscosity of from 20 to 200 mPa·s (at 25° C.) as measured by an E type rotary viscometer at 100 rpm and having a shear thinning viscosity index of from 0.1 to 0.8 is preferred.

The shear-thinning viscosity index n can be determined in accordance with the experimental formula:

$$T = Kj^n$$

(in which T: a shear stress, j: shear rate, K: calculated constant).

As the shear-thinning tackifier, a substance soluble or dispersible in water is effective. Examples of it include xanthan gum, welan gum, succinoglycan (having a mean molecular weight of from about 100 to 8,000,000) which is an organic-acid-modified heteropolysaccharide having glucose and galactose as a constituent monosaccharide, gum having as a polymer component glucose, glucronic acid, fucose and rhamnose, guar gum, locust bean gum and its derivatives, hydroxyethyl cellulose, alkyl alginates, polymers composed mainly of an alkyl methacrylate and having a molecular weight of from 100,000 to 150,000, glucomannan, thickening polysaccharides having a gelling property and extracted from seaweed such as agar and carrageenan, benzylidenesorbitol and benzylidenexylitol and their derivatives, crosslinking acrylic acid polymers, inorganic fine particles, nonionic surfactants having HLB of from 8 to 12 such as polyglycerin fatty acid esters, polyoxyethylenesorbitan fatty acid esters, polyethylene glycol fatty acid esters, polyoxyethylene alkyl ether-polyoxypropylene alkyl ethers, polyoxyethylene alkylphenyl ethers, and fatty acid amides, and salts of dialkyl or dialkenylsulfosuccinic acids. They may be used either singly or in combination.

The shear-thinning tackifier may be added in an amount ranging from 0.1 to 20 wt % in the ink composition.

In a system using the shear thinning tackifier and thickening inhibitor in combination, a decrease in water content in the ink makes the former one half swollen and an apparent ink viscosity hardly increases. As the shear-thinning tackifier, xanthan gum, welan gum and succinoglycan are preferred because they are excellent in stability of the resulting ink.

One or more water-soluble resins such as acrylic resin, styrene-maleic acid copolymer, polyvinylpyrrolidone, polyvinyl alcohol and dextrin may also be added within an extent not interfering with the drying resistance of the ink.

The water-based ink composition for ballpoint pen according to the present invention preferably comprises a sugar mixture containing at least 40 wt % of saccharides having at least 10 monosaccharide molecules, because it can satisfy dry-up resistance and prevents sag of ink.

Monosaccharides or disaccharides do not form a dry film sufficiently. In addition, since they have high water absorption, application of them to a ballpoint pen tends to cause sag when the ballpoint pen is left with the writing tip end down. Saccharides having 3 to 8 monosaccharide molecules cannot attain sufficient sag prevention performance though their water absorption is lower than that of monosaccharides or disaccharides.

The above-described saccharides have lower hygroscopicity and tend to form a dry film as they have greater molecular weight, so that use of saccharides having at least 10 monosaccharide molecules makes it possible to prevent sag of an ink while maintaining a cap-off performance.

As the saccharides having at least 10 monosaccharide molecules, a glucose syrup available by decomposition of starch by an enzyme or a hydrogenated glucose syrup available by reduction of the terminal group of the glucose syrup can be used.

It is technically difficult and takes a large production cost to isolate saccharides having at least 10 monosaccharide molecules alone, because a starch is decomposed into saccharides having a variety of polymerization degrees. The above-described performance can be exhibited fully by incorporation of at least 40 wt.% of saccharides having at least 10 monosaccharide molecules in a sugar mixture in which saccharides having 9 or less monosaccharide molecules exist.

The above-described sugar mixture is added in an amount of from 0.5 to 10.0 wt %, preferably from 1.0 to 8.0 wt %, based on the total amount of the ink composition. When the amount is less than 0.5 wt %, sag prevention effect cannot be attained easily. When it exceeds 10.0 wt %, on the other hand, a viscosity increase of the ink causes ink accumulation at the writing tip end or adhesion of this accumulation onto paper or damages ink follow-up property during writing.

The above-described ink composition is filled in a ballpoint pen equipped, at the writing tip end thereof, a ballpoint pen tip.

Although no particular limitation is imposed on the structure or shape of a ballpoint pen itself, the ballpoint pen of the invention has, housed in a barrel thereof, a ballpoint pen refill which has an ink container tube filled with an ink composition. The ink container tube is communicated with a ballpoint pen tip which holds a ball in the end portion thereof. An ink follower composition is in close contact with the end surface of the ink composition.

The ballpoint pen may have another structure in which it has a barrel filled with the ink composition; the barrel is communicated with a ballpoint pen tip which holds a ball in the end portion of the barrel; and an ink follower composition is in close contact with the end surface of the ink composition.

The ballpoint pen having the above-described structure preferably has a cap.

As the structure of a ballpoint pen tip, any conventional and popular mechanism is effective. Examples of it include a mechanism which holds a ball in a ball holding portion thereof formed by deforming a metal pipe, in the vicinity of its end, under pressure inward from the outside surface; a mechanism which holds a ball in a ball holding portion while forming a chip portion by cutting of a metal material by drill or the like; a mechanism in which a ball is biased forward by a spring; and a mechanism having, inside of a chip made of a metal or plastic, a ball seat made of a resin.

As the ball, usable is a ball made of a hard metal, stainless steel, ruby, ceramics, resin, rubber or the like and having a diameter of about from 0.1 to 3.0 mm, preferably from 0.3 to 1.0 mm, more preferably from 0.3 to 0.7 mm.

As the ink container tube or barrel for storing the ink composition therein, a molded or formed article made of a thermoplastic resin such as polyethylene, polypropylene, polyethylene terephthalate or nylon is used.

The ink container tube or barrel is preferably formed of a transparent, colored transparent or semitransparent molded or formed article, because it enables confirmation of the ink color and the ink quantity through it.

When the water-based ink composition for ballpoint pen is filled in a capless ballpoint pen, no particular limitation is imposed on the structure or shape of the capless ballpoint pen. Any structure or shape can be employed insofar as the writing tip end of the ballpoint pen refill is stored in a barrel while being exposed to the air and the writing tip end protrudes from the opening portion of the barrel, actuated by a retractable mechanism.

Examples of the operation method of the retractable mechanism include knock type, rotation type and slide type.

The knock type has, for example, a knocking portion at the rear end portion or side surface portion of a barrel and the writing tip end of a ballpoint pen refill is protruded or retracted from the front end opening portion of the barrel by pushing the knocking portion or by pushing the clip portion disposed at the barrel.

The rotation type has, for example, a rotating portion at the rear portion of a barrel and by turning the rotating portion, the writing tip end of a ballpoint pen refill can be protruded or retracted from the front-end opening portion of the barrel.

The slide type has, for example, a slide portion on the side surface of a barrel and by operating this slide, the writing tip end of a ballpoint pen refill can be protruded or retracted from the front opening portion of the barrel. Alternatively, the writing tip end of the ballpoint pen refill can be protruded or retracted from the front end opening portion of the barrel by sliding the clip portion disposed at the barrel.

The capless ballpoint pen may be a composite type capless ballpoint pen having, stored in a barrel thereof, a plurality of ballpoint pen refills.

The ink container tube or barrel constituting the ballpoint pen refill may be made of a resin or a metal.

In the rear end of the ink filled in the ink container tube or barrel, an ink follower can be filled.

The ink follower composition is composed of a nonvolatile liquid or refractory liquid.

Specific examples include petrolatum, spindle oil, castor oil, olive oil, refined mineral oil, liquid paraffin, polybutene, α-olefin, oligomers or co-oligomers of α-olefin, dimethyl silicone oil, methyl phenyl silicone oil, amino-modified silicone oil, polyether-modified silicone oil and fatty-acid-modified silicone oil. They may be used either singly or in combination.

It is preferred to add a gelling agent to the above-described non-volatile liquid and/or refractory liquid in order to increase its viscosity to a desired level. Examples of the gelling agent include clay type thickeners such as silica having a surface subjected to hydrophobic treatment, fine particle silica having a methylated surface, aluminum silicate, expandable mica, and bentonite or montmorillonite-subjected to hydrophobic treatment; fatty acid metal soaps such as magnesium stearate, calcium stearate, aluminum stearate and zinc stearate; tribenzylidene sorbitol, fatty acid amides, amide-modified polyethylene wax, hydrogenated castor oil, dextrin compounds such as fatty acid dextrin and cellulose compounds.

The ink follower composition in the liquid form can also be used in combination with an ink follower in the solid form.

EXAMPLES

Components and their ratios of the water-based ink compositions for ballpoint pen will be shown in the following tables. Numerals in these tables indicate wt %.

(5) Compound represented by the formula (4) having as $R_4$ a methyl group
(6) Compound represented by the formula (4) having as $R_4$ a butyl group
(7) Polymerization degree (n)=2 to 6
(8) "N-V-2/RC", trade name, product of ISP Japan
(9) "CHP", trade name; product of ISP Japan

TABLE 1

| Raw materials | Note | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Aqueous solution of black dye | (1) | | 30.0 | | | 30.0 | | | 30.0 | | 30.0 | | | |
| Red dye | (2) | | | 3.0 | 3.0 | | 3.0 | | | 3.0 | | 3.0 | 3.0 | 3.0 |
| Dispersion of blue pigment | (3) | 20.0 | | | | | | 20.0 | | | | | | |
| Xanthan gum | (4) | 0.5 | 0.5 | 0.5 | 0.5 | 0.5 | 0.5 | 0.5 | 0.5 | 0.5 | 0.5 | 0.5 | 0.5 | 0.5 |
| N-ethyl-2-pyrrolidone | | 10.0 | | | | | | | | | | | | |
| N-n-hexyl-2-pyrrolidone | | | | | 5.0 | | | | | | | | | |
| N-methyl-2-piperidone | | | 10.0 | | | | | | | | | | | |
| N-n-butyl-caprolactam | | | | | | 5.0 | | | | | | | | |
| 2-Pyrrolidone/aldehyde condensate A | (5) | | | 20.0 | | | | | | | | | | |
| 2-Pyrrolidone-aldehyde condensate B | (6) | | | | | | 10.0 | | | | | | | |
| Oligomer of N-vinyl-2-pyrrolidone | (7) | | | | | | | 5.0 | 10.0 | 25.0 | | | | 20.0 |
| N-vinyl-2-pyrrolidone | (8) | | | | | | | | | | 10.0 | | | |
| N-cyclohexyl-2-pyrrolidone | (9) | | | | | | | | | | | 10.0 | | |
| ε-Caprolactam | (10) | | | | | | | | | | | | 10.0 | |
| Lubricant | (11) | 0.1 | 0.2 | 0.2 | 0.2 | 0.2 | 0.2 | 0.1 | 0.2 | 0.3 | 0.2 | 0.3 | 0.3 | 0.3 |
| Sugar mixture | (12) | | | | | | 5.0 | | | | | | | 5.0 |
| Carbolic acid | | 0.3 | 0.3 | 0.3 | 0.3 | 0.3 | 0.3 | 0.3 | 0.3 | 0.3 | 0.3 | 0.3 | 0.3 | 0.3 |
| 2-Pyrrolidone | | | 5.0 | | | | | 5.0 | | | | | 5.0 | |
| Diethylene glycol | | | | | 5.0 | | | | | | | 5.0 | | |
| Glycerin | | | | 5.0 | | | | | 5.0 | | 5.0 | | | |
| Water | | 69.1 | 54.0 | 71.0 | 86.0 | 64.0 | 81.0 | 69.1 | 54.0 | 70.9 | 54.0 | 80.9 | 80.9 | 70.9 |

TABLE 2

| Raw materials | Note | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Aqueous solution of black dye | (1) | | 30.0 | | | | 30.0 | | 30.0 | | |
| Red dye | (2) | | | 3.0 | 3.0 | 3.0 | | | | 3.0 | 3.0 |
| Blue pigment dispersion | (3) | 20.0 | | | | | | 20.0 | | | |
| Xanthan gum | (4) | 0.5 | 0.5 | 0.5 | 0.5 | 0.5 | 0.5 | 0.5 | 0.5 | 0.5 | 0.5 |
| N-methyl-2-pyrrolidone | | 10.0 | | | | | | | | | |
| 2-Piperidone | | | 10.0 | | | | | | | | |
| 2-Pyrrolidone/aldehyde condensate C | (13) | | | 20.0 | | | | | | | |
| Lubricant | (11) | 0.1 | 0.2 | 0.2 | 0.2 | 0.2 | 0.2 | 0.1 | 0.2 | 0.3 | 0.3 |
| Carbolic acid | | 0.3 | 0.3 | 0.3 | 0.3 | 0.3 | 0.3 | 0.3 | 0.3 | 0.3 | 0.3 |
| 2-Pyrrolidone | | | | | 20.0 | | | 10.0 | | | |
| Diethylene glycol | | | | | | | 20.0 | | | | 20.0 |
| Glycerin | | | | | | 25.0 | | | 15.0 | 25.0 | |
| Water | | 69.1 | 59.0 | 76.0 | 76.0 | 71.0 | 49.0 | 69.1 | 54.0 | 70.9 | 75.9 |

Raw materials in the tables will next be described in numerical order.

(1) "Water Black 100L", trade name; product of Orient Chemical Industry, dye content: 20%
(2) "Floxin", trade name; product of Aizen Co., Ltd.
(3) "SANDYE SUPER BLUE GLL", trade name; product of Sanyo Color Works Ltd., pigment content: 22%
(4) "KELZAN", trade name; product of Sansho Co., Ltd.
(10) "Caprolactam", trade name; product of Ube Industries Ltd.
(11) "PLYSURF M208B", trade name of ethanolamine salt of polyoxyethylene octyl ether phosphate, product of Daiichi Kogyo Seiyaku Co., Ltd.
(12) "SUNDEC 30", trade name of a sugar mixture containing at least 73.5% of a glucose syrup having at least 10 monosaccharide molecules, product of Hayashibara Shoji Inc.

(13) Compound represented by the formula (4) having as $R_4$ a hydrogen atom.

Mixtures shown in Examples and Comparative Examples were each stirred in a mixer for 1 hour while heating at 60° C. The reaction mixture was then cooled and filtered, whereby a water-based ink composition for ballpoint pen was obtained.

Manufacture of Water-Based Ballpoint Pen:

Each of the ink compositions prepared in Examples 1 to 3 and Comparative Examples 1 to 3 was filled in an ink container tube having, fitted at one end of the propylene pipe thereof, a tip made of stainless steel and holding therein a ball of 0.5 mm diameter. An ink follower was then filled in the ink container tube in close contact with the rear end portion of the ink, whereby a ballpoint pen refill was manufactured.

A ballpoint pen was obtained by inserting the ballpoint pen refill in a barrel.

The ballpoint pen thus obtained is equipped with a cap.

Manufacture of Capless Ballpoint Pen:

After each of the ink compositions prepared in Examples 4 to 13 and Comparative Examples 4 to 10 was filled in an ink container tube having, fitted at one end of the polypropylene pipe thereof, a tip made of a stainless steel and holding therein a ball having a diameter of 0.4 mm, an ink follower was filled in the ink container tube in close contact with the rear end portion of the ink, whereby a ballpoint pen refill was obtained.

A capless ballpoint pen was obtained by inserting the ballpoint pen refill in a barrel.

The capless ballpoint pen thus obtained is stored in a barrel with its writing tip end, disposed in a ballpoint pen refill, exposed to the air and the writing tip end protrudes from the opening portion of the barrel, actuated by a retractable mechanism (knocking mechanism) at the rear end portion of the barrel.

Dry-Up Resistance Test:

The ballpoint pens and capless ballpoint pens obtained in the above-described manners were each allowed to stand at 25° C. for 60 days with the bottom up (with the writing tip end down). Handwriting with the ballpoint pen was observed visually.

The test was conducted while removing the cap from the ballpoint pen.

Sag Test:

The ballpoint pens and capless ballpoint pens obtained in the above-described manners were each allowed to stand in an atmosphere of 25° C. and relative humidity of 90% for 20 hours with the bottom up (with the writing tip end down). Appearance of the writing tip end was observed visually.

The test was conducted while removing the cap from the ballpoint pen.

With regards to each ink composition, a ratio (x) of a viscosity after evaporation, from ink, of 40 wt % of water relative to the total ink amount to an initial ink viscosity (as measured by EMD viscometer at 1 rpm and 20° C.), dry-up resistance test results and sag test results are shown in the below tables.

In the above tables, judgment was conducted in accordance with the following criteria.

Dry-Up Resistance Test:
A: Good handwriting which is uniform and has no blur.
B: Handwriting without blur.
C: Handwriting with some blur.

Sag Test:
A: No leakage (sag) of ink.
B: A small ink drop exists at the tip end.
C: A large ink drop exists at the tip end, or ink leaking from the tip end drops.

TABLE 3

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| X (20° C.) | 0.7 | 0.1 | 0.6 | 0.1 | 0.1 | 0.1 | 0.8 | 0.3 | 0.2 | 0.4 | 0.3 | 0.5 | 0.2 |
| Dry-up resistance test | B | A | B | B | B | A | B | A | B | A | A | B | A |
| Sag test | B | B | B | B | B | A | B | B | B | B | B | B | A |

TABLE 4

| | Comparative Examples | | | | | | | | | |
|---|---|---|---|---|---|---|---|---|---|---|
| | 1 | 2 | 3 | 4 | 5 | 6 | 7 | 8 | 9 | 10 |
| X (20° C.) | 5.2 | 2.6 | 3.5 | 2.9 | 4.5 | 3.4 | 2.9 | 5.0 | 4.5 | 3.4 |
| Dry-up resistance test | C | C | C | C | C | C | C | C | C | C |
| Sag test | B | B | B | C | C | C | B | C | C | C |

While the invention has been described in detail and with reference to specific embodiments thereof, it will be apparent to one skilled in the art that various changes and modifications can be made therein without departing from the scope thereof.

This application is based on Japanese patent application No. 2004-270917 filed on Sep. 17, 2004, Japanese patent application No. 2005-199669 filed on Jul. 8, 2005 and Japanese patent application No. 2005-199670 filed on Jul. 8, 2005 the entire contents thereof being hereby incorporated by reference.

What is claimed is:

1. A water-based ink composition for ballpoint pen, which comprises at least a colorant, water, a shear-thinning tackifier and a thickening inhibitor,
   wherein a ratio (x) of a viscosity after evaporation of 40 wt% of water from the total ink amount to an initial ink viscosity (as measured by EMD viscometer at 1 rpm and 20 ° C) is 2 or less.

2. A water-based ink composition for ballpoint pen, which comprises at least a colorant, water, a shear-thinning tackifier, and a thickening inhibitor selected from the group consisting of compounds represented by the following formulas (1) to (6), an oligomer of N-vinyl-2-piperidone and an oligomer of N-vinyl-ε-caprolactam:

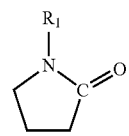

(1)

(wherein, $R_1$ represents a linear or branched $C_{2-8}$ alkyl group or a cyclohexyl group),

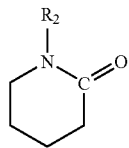

(2)

(wherein, $R_2$ represents a linear or branched $C_{1-7}$ alkyl group, a vinyl group or a cyclohexyl group),

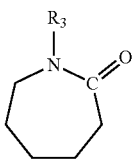

(3)

(wherein, $R_3$ represents a linear or branched $C_{1-6}$ alkyl group, a vinyl group or a cyclohexyl group),

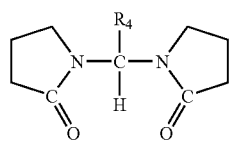

(4)

(wherein, $R_4$ represents a linear or branched $C_{1-10}$ alkyl group),

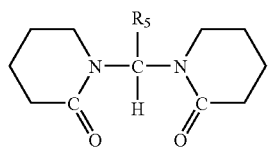

(5)

(wherein, $R_5$ represents a hydrogen atom, or a linear or branched $C_{1-8}$ alkyl group), and

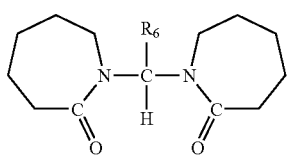

(6)

(wherein, $R_6$ represents a hydrogen atom or a linear or branched $C_{1-6}$ alkyl group).

3. A water-based ink composition for capless ballpoint pen, which comprises at least a colorant, water, a shear-thinning tackifier and a thickening inhibitor selected from the group consisting of an oligomer of N-vinyl-2-pyrrolidone represented by the following formula (7), N-vinyl-2-pyrrolidone, N-cyclohexyl-2-pyrrolidone, and ε-caprolactam,

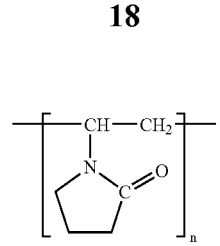

(7)

wherein n is an integer from 2 to 20.

4. A capless ballpoint pen which comprises a ballpoint pen refill and a water-based ink composition as claimed in any one of claims 2 or 3
wherein a writing tip end of said ballpoint pen refill protrudes or retracts from a front-end opening portion of a barrel, actuated by a retractable mechanism; and
wherein the ink composition is filled in the ballpoint pen refill.

5. The capless ballpoint pen according to claim 4, which comprises an ink follower which, is disposed at a rear end surface of the water-based ink composition and follows the ink composition as the ink composition is consumed.

6. The water-based ink composition for ballpoint pen according to any one of claims 1, 2, or 3, which comprises the thickening inhibitor in an amount of from 1 to 40wt. %

7. The water-based ink composition for ballpoint pen according to any one of claims 1, 2, or 3, wherein the shear-thinning tackifier is a polysaccharide.

8. The water-based ink composition for ballpoint pen according to claim 7, wherein the shear-thinning tackifier is selected from xanthan gum, welan gum and succinoglycan.

9. The water-based ink composition for ballpoint pen according to any one of claims 1, 2, or 3, which further comprises a sugar mixture containing at least 40 wt% of saccharides having at least 10 monosaccharide molecules.

10. The water-based ink composition for ballpoint pen according to claim 9, wherein the sugar mixture is a glucose syrup or hydrogenated glucose syrup.

11. The water-based ink composition for ballpoint pen according to claim 9, wherein the sugar mixture is contained in an amount of from 0.5 to 10 wt%.

12. The water-based ink composition for ballpoint pen according to any one of claims 1, 2, or 3, which is free of a water soluble organic solvent.

13. The water-based ink composition for ballpoint pen according to any one of claims 1, 2, or 3, which further comprises a water soluble organic solvent,
wherein the content of the water soluble organic solvent is 10 wt% or less based on the total amount of the ink composition.

14. A ballpoint pen comprising a ballpoint pen refill filled with a water-based ink composition as claimed in claim 1 or 2, said ballpoint pen refill being accommodated in a barrel in the ballpoint pen.

15. A ballpoint pen according to claim 14, which further comprises an ink follower which is located at the rear end surface of the ink composition and follows the ink as the ink is consumed.

16. The ballpoint pen according to claim 15, which is equipped with a cap.

17. The ballpoint pen according to claim 14, which is equipped with a cap.

18. A ballpoint pen comprising a water-based ink composition claimed in claim 1 or 2, said ink composition being accommodated in a barrel in the ballpoint pen.

19. A ballpoint pen according to claim 18, which further comprises an ink follower which is located at a rear end surface of the ink composition and follows the ink composition as the ink composition is consumed.

20. The ballpoint pen according to claim 18, which is equipped with a cap.

* * * * *